United States Patent
Xie et al.

(10) Patent No.: US 9,815,333 B2
(45) Date of Patent: Nov. 14, 2017

(54) METHOD AND DEVICE FOR MANAGING A SELF-BALANCING VEHICLE BASED ON PROVIDING A WARNING MESSAGE TO A SMART WEARABLE DEVICE

(71) Applicant: Xiaomi Inc., Beijing (CN)

(72) Inventors: Yan Xie, Beijing (CN); Tian Ren, Beijing (CN); Yue Cheng, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/179,352

(22) Filed: Jun. 10, 2016

(65) Prior Publication Data

US 2016/0375825 A1 Dec. 29, 2016

(30) Foreign Application Priority Data

Jun. 26, 2015 (CN) .......................... 2015 1 0363955

(51) Int. Cl.
  *G08B 21/00* (2006.01)
  *B60C 9/00* (2006.01)
  (Continued)

(52) U.S. Cl.
  CPC ........ *B60C 9/00* (2013.01); *B60L 3/00* (2013.01); *B62K 11/007* (2016.11); *G06F 1/163* (2013.01);
  (Continued)

(58) Field of Classification Search
  CPC ........................................ B60Q 9/00
  (Continued)

(56) References Cited

U.S. PATENT DOCUMENTS 9,020,538 B1 4/2015 White et al.
2013/0040610 A1 2/2013 Migicovsky et al.
(Continued)

FOREIGN PATENT DOCUMENTS

CN 203888925 U 10/2014
CN 204210654 U 3/2015
(Continued)

OTHER PUBLICATIONS

International Search Report of International Application No. PCT/CN2015/095149, dated Mar. 31, 2016, issued by the State Intellectual Property Office of P.R. China as the ISA (5 pages).
(Continued)

*Primary Examiner* — Jeffery Hofsass
(74) *Attorney, Agent, or Firm* — Finnegan, Henderson, Farabow, Garrett & Dunner LLP

(57) ABSTRACT

A method for managing a self-balancing vehicle includes establishing a first Blue Tooth connection with the self-balancing vehicle, acquiring traveling state data of the self-balancing vehicle through the first Blue Tooth connection, determining whether a smart warning mode is enabled, establishing a second Blue Tooth connection with a smart wearable device if the smart warning mode is enabled, acquiring a preset monitored item and a preset warning event, monitoring the monitored item in the traveling state data for determining whether the warning event has occurred, and sending a warning message to the smart wearable device through the second Blue Tooth connection if the warning event has occurred.

20 Claims, 11 Drawing Sheets

Smart Wearable Device

User Terminal

Self-Balancing Vehicle

(51) Int. Cl.
  *B60L 3/00* (2006.01)
  *H04W 4/04* (2009.01)
  *G06F 1/16* (2006.01)
  *B62K 11/00* (2006.01)
  *H04W 4/00* (2009.01)
  *H04W 4/02* (2009.01)

(52) U.S. Cl.
  CPC ........... *H04W 4/028* (2013.01); *H04W 4/046* (2013.01); *H04W 4/008* (2013.01); *H04W 4/027* (2013.01)

(58) Field of Classification Search
  USPC ................ 701/1, 22; 180/180, 181; 340/438
  See application file for complete search history.

(56) References Cited

U.S. PATENT DOCUMENTS

2015/0045992 A1 2/2015 Ashby et al.
2016/0378106 A1* 12/2016 Xie .................. G07C 5/06
  701/2

FOREIGN PATENT DOCUMENTS

| CN | 104503671 A | 4/2015 |
| CN | 104506649 A | 4/2015 |
| CN | 204323601 U | 5/2015 |
| CN | 104950728 A | 9/2015 |
| RU | 62726 U1 | 4/2007 |
| WO | WO 2015/006196 A1 | 1/2015 |

OTHER PUBLICATIONS

Extended Search Report for European Application No. 16170539.7-1870, from the European Patent Office, dated Oct. 21, 2016.
English version of International Search Report of PCT Application No. PCT/CN2015/095149, dated Mar. 31, 2016, issued by the ISA/CN—State Intellectual Property Office of the P.R. China.
Office Action for Russian Application No. 2016116903/11(028574), dated May 31, 2017.

* cited by examiner

140

1110 — When Searching out Plurality of Smart Wearable Devices, Receiving User Selection Instruction with Respect to Smart Wearable Device, and Connecting Smart Wearable Device Selected by User According to User Selection Instruction 1120 — When Searching out Plurality of Smart Wearable Devices, Connecting Smart Wearable Device with Highest Priority According to Preset Priority Order

Fig. 11

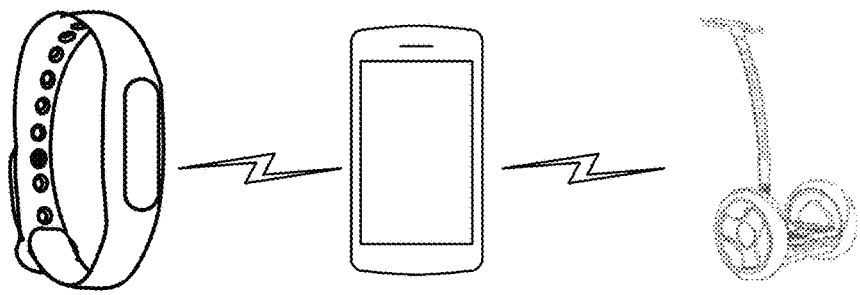

Smart Wearable Device    User Terminal    Self-Balancing Vehicle

Fig. 12

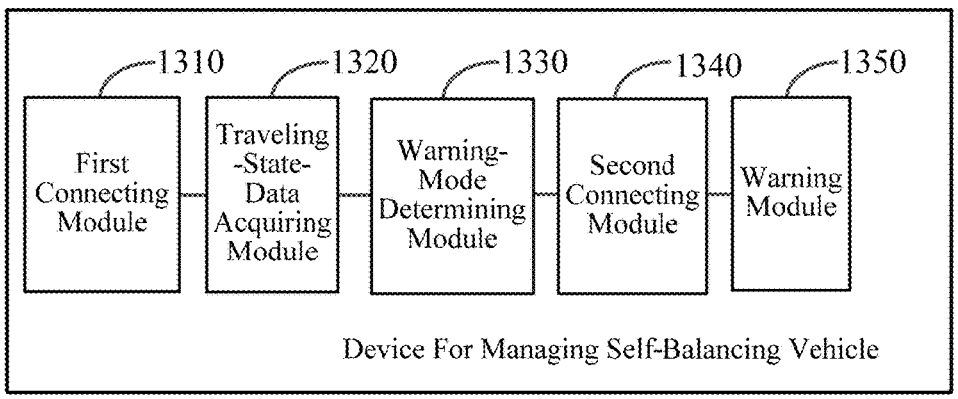

Fig. 13

METHOD AND DEVICE FOR MANAGING A SELF-BALANCING VEHICLE BASED ON PROVIDING A WARNING MESSAGE TO A SMART WEARABLE DEVICE

CROSS-REFERENCE TO RELATED APPLICATIONS

The present application is based upon and claims priority to Chinese Patent Application No. 201510363955.8, filed Jun. 26, 2015, the entire contents of which are incorporated herein by reference.

TECHNICAL FIELD

The present disclosure relates to network communication technology and, more particularly, to a method and device for managing a self-balancing vehicle.

BACKGROUND

A self-balancing vehicle can detect changes in its posture by a built-in gyroscope and acceleration sensor, and can adjust a driving motor accordingly by a servo management system to balance the vehicle. The self-balancing vehicle can be, for example, a two-wheel vehicle, such as a self-balancing scooter, or a one-wheel vehicle, such as a self-balancing unicycle.

SUMMARY

In accordance with the present disclosure, there is provided a method for managing a self-balancing vehicle. The method includes establishing a first Blue Tooth connection with the self-balancing vehicle, acquiring traveling state data of the self-balancing vehicle through the first Blue Tooth connection, determining whether a smart warning mode is enabled, establishing a second Blue Tooth connection with a smart wearable device if the smart warning mode is enabled, acquiring a preset monitored item and a preset warning event, monitoring the monitored item in the traveling state data for determining whether the warning event has occurred, and sending a warning message to the smart wearable device through the second Blue Tooth connection if the warning event has occurred.

Also in accordance with the present disclosure, there is provided an apparatus for managing a self-balancing vehicle. The apparatus includes a processor and a memory storing instructions that, when executed by the processor, cause the processor to establish a first Blue Tooth connection with the self-balancing vehicle, acquire traveling state data of the self-balancing vehicle through the first Blue Tooth connection, determine whether a smart warning mode is enabled, establish a second Blue Tooth connection with a smart wearable device if the smart warning mode is enabled, acquire a preset monitored item and a preset warning event, monitor the monitored item in the traveling state data for determining whether the warning event has occurred, and send a warning message to the smart wearable device through the second Blue Tooth connection if the warning event has occurred.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 11 is a flow chart illustrating an exemplary detailed process of process 140 shown in FIG. 1.

FIG. 12 is a diagram illustrating an application scenario of a method for managing a self-balancing vehicle according to an exemplary embodiment of the present disclosure.

FIG. 13 is a block diagram of a device for managing a self-balancing vehicle according to an exemplary embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used herein are merely for describing a particular embodiment, rather than limiting the present disclosure. As used in the present disclosure and the appended claims, terms in singular forms such as "a", "said" and "the" are intended to also include plural forms, unless explicitly dictated otherwise. It should also be understood that the term "and/or" used herein means any one or any possible combination of one or more associated listed items.

It should be understood that, although an element may be described with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when", "where" or "in response to".

Figure 1:
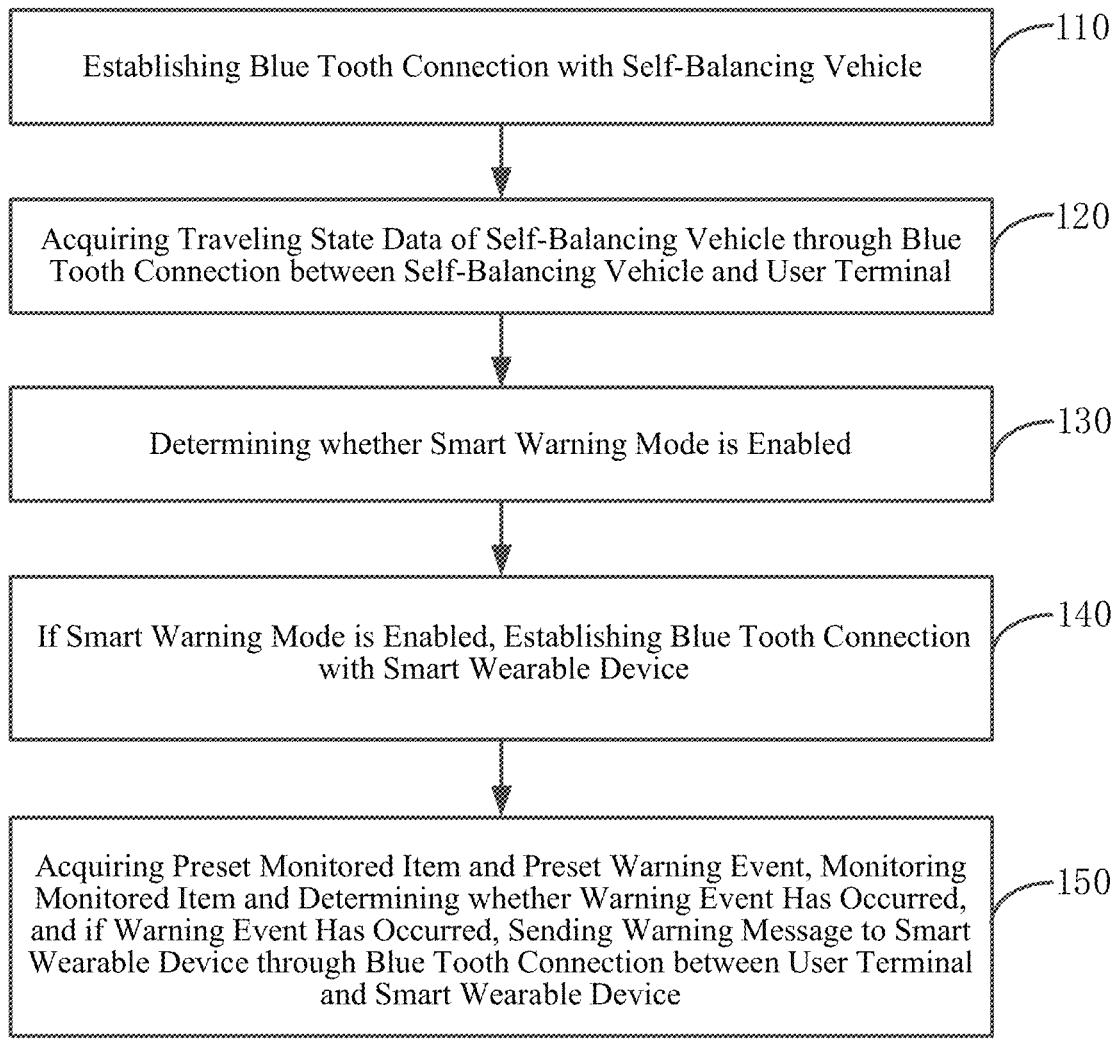
FIG. 1 is a flow chart illustrating a method for managing a self-balancing vehicle according to an exemplary embodiment of the present disclosure.

FIG. 1 is a flow chart of a method 100 for managing a self-balancing vehicle according to an exemplary embodiment of the present disclosure, which can be implemented, for example, in a user terminal. The self-balancing vehicle can be selected and managed by the user.

As shown in FIG. 1, at 110, a Blue Tooth connection with the self-balancing vehicle is established. Thus, the user terminal can exchange data with the self-balancing vehicle in a short range through the Blue Tooth connection.

At 120, traveling state data of the self-balancing vehicle is acquired through the Blue Tooth connection. In some embodiments, the traveling state data of the self-balancing vehicle can include at least one of a current remaining battery power, a current locking state or a current unlocking state, a current light color, a current traveling direction, a current traveling speed, a current body temperature, or a current location. In some embodiments, the traveling state data of the self-balancing vehicle can additionally or alternatively include performance and operation condition of the self-balancing vehicle and/or a location of the self-balancing vehicle.

At 130, it is determined whether a smart warning mode is enabled. According to the present disclosure, the user terminal can have a smart warning mode. In the smart warning mode, when the occurrence of any abnormality in the traveling state data of the self-balancing vehicle is detected, the user terminal can warn the user through a smart wearable device, such that the user can timely learn about the abnormality of the self-balancing vehicle. In some embodiments, the user terminal provides a management interface for the user to manage the self-balancing vehicle. The user can click a preset button in the management interface to enable the smart warning mode, or can click a built-in button of the user terminal itself to enable the smart warning mode.

At 140, if the smart warning mode is enabled, a Blue Tooth connection with the smart wearable device is established. Thus, when the user terminal monitors that any abnormality in the traveling state data of the self-balancing vehicle occurs, the user terminal can control the smart wearable device to warn the user. Moreover, after the user terminal establishes the Blue Tooth connection with the smart wearable device, the user terminal can exchange data with the smart wearable device in a short range through the Blue Tooth connection. The smart wearable device connected with the user terminal can be a device selected by the user and accepting instructions from the user, or can be a device selected according to other criteria, such as device priorities. In some embodiments, the smart wearable device can be carried by the user, such as a smart bracelet, a smart watch, a smart ring, a smart necklace, smart glasses, a smart earpiece, etc.

At 150, a preset monitored item and a preset warning event are acquired. The monitored item in the traveling state data is monitored for determining whether the warning event has occurred. If the warning event has occurred, a warning message is sent to the smart wearable device through the Blue Tooth connection. According to the present disclosure, the preset monitored item and the preset warning event can be set automatically by the user terminal according to a practical application, can be set by the user, or can be designated by a server. The preset monitored item can be one or more travelling states of the self-balancing vehicle, such as a traveling speed, a body temperature, a remaining battery power, etc. The preset warning event can be an abnormal state of the self-balancing vehicle that the user should be aware of. For example, when a traveling speed of the self-balancing vehicle is higher than a speed threshold, the user should be warned of this higher traveling speed.

Therefore, according to the present disclosure, the user terminal can warn the user through the smart wearable device such that the user can timely learn about the warning message through the smart wearable device. Thus, not only the safety in operating the self-balancing vehicle is improved, but the user experience is also improved.

Figure 2:
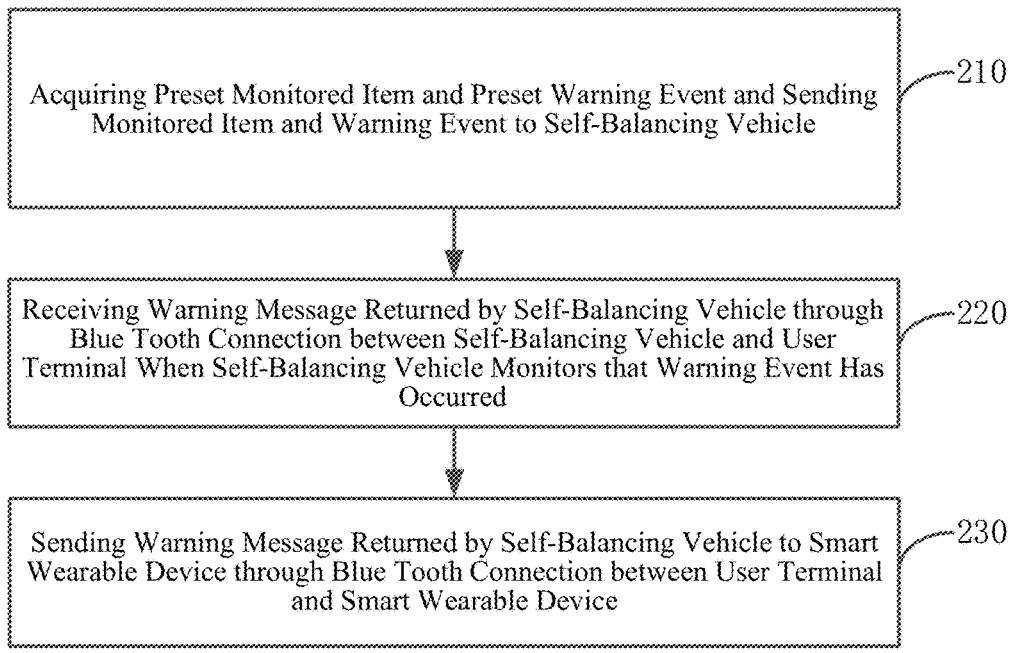
FIG. 2 is a flow chart illustrating an exemplary detailed process of process 150 shown in FIG. 1.

FIG. 2 is a flow chart of an exemplary detailed process of 150 of FIG. 1. As shown in FIG. 2, at 210, the preset monitored item and the preset warning event are acquired and are sent to the self-balancing vehicle, such that the self-balancing vehicle monitors the monitored item in its traveling state data. After the user terminal sends the monitored item and the warning event to the self-balancing vehicle, the self-balancing vehicle takes charge of monitoring its traveling state data. When the self-balancing vehicle monitors that any abnormality in its performance occurs, the self-balancing vehicle will initiatively send a warning message to the user terminal, to cause the user terminal to inform the user of the abnormality.

At 220, a warning message is received, which is returned by the self-balancing vehicle through the Blue Tooth connection between the self-balancing vehicle and the user terminal when the self-balancing vehicle monitors that the warning event has occurred. Under the smart warning mode, after the user terminal receives the warning message returned by the self-balancing vehicle, the user terminal will warn the user through the smart wearable device.

At 230, the warning message returned by the self-balancing vehicle is sent to the smart wearable device through the Blue Tooth connection between the user terminal and the smart wearable device, such that the smart wearable device performs warning. After the user terminal sends the warning message to the smart wearable device, the smart wearable device will warn the user according to the warning message. Thereby, the user can timely learn that abnormality occurs in the self-balancing vehicle.

Therefore, according to the present disclosure, the user can timely learn about the warning message returned by the self-balancing vehicle through the smart wearable device.

Figure 3:
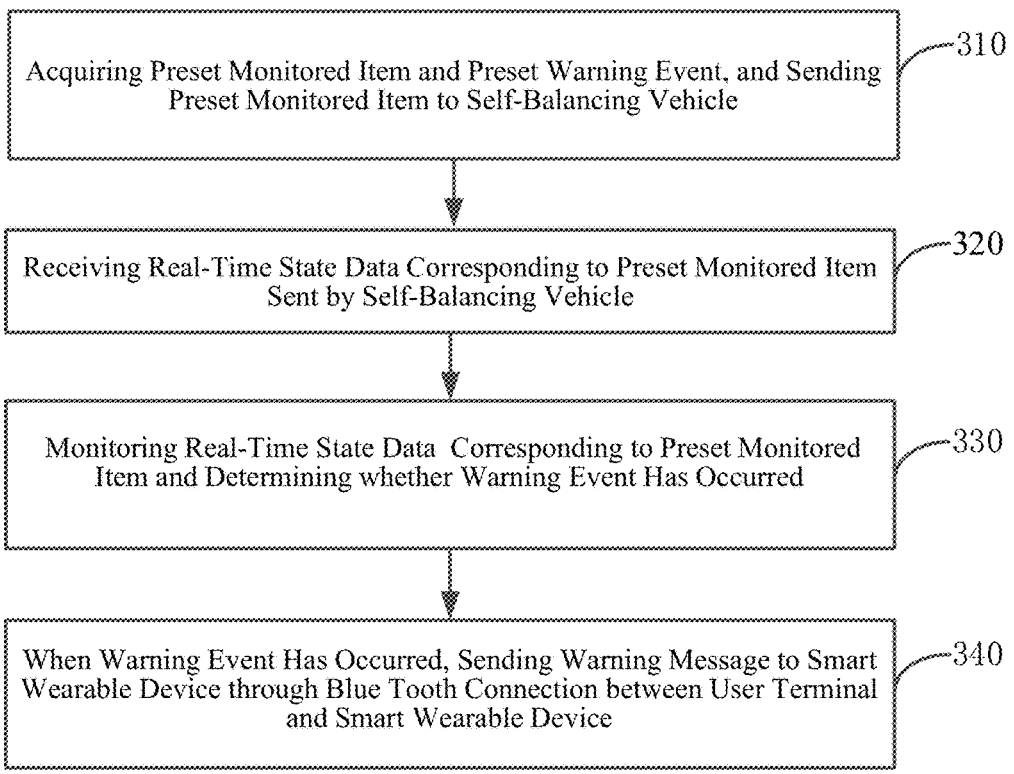
FIG. 3 is a flow chart illustrating another exemplary detailed process of process 150 shown in FIG. 1.

FIG. 3 is a flow chart of another exemplary detailed process of 150 in FIG. 1. As shown in FIG. 3, at 310, the preset monitored item and the preset warning event are acquired, and the preset monitored item is sent to the self-balancing vehicle. That is, after the user terminal acquires the preset monitored item and the preset warning event, the user terminal only sends the preset monitored item to the self-balancing vehicle. The self-balancing vehicle only acquires real-time state data corresponding to the preset monitored item and sends the real-time state data corresponding to the preset monitored item to the user terminal at preset timings or periodically. The user terminal takes charge of monitoring the real-time state data corresponding to the preset monitored item. When the user terminal monitors that any abnormality occurs, the user terminal will warn the user through the smart wearable device. Thereby, the user can timely learn about the abnormality.

At 320, the real-time state data corresponding to the preset monitored item, which is sent by the self-balancing vehicle, is received. According to the present disclosure, the preset monitored item can be one or more travelling states of the self-balancing vehicle. For example, the preset monitored item can be a traveling speed. Thus, the corresponding real-time state data received at a first time point can be, e.g., 5 km/h, and the corresponding real-time state data received at a second time point can be, e.g., 12 km/h.

At 330, the real-time state data corresponding to the preset monitored item is monitored for determining whether the warning event has occurred. For example, the warning event corresponding to the traveling speed is that the traveling speed is higher than 5 km/h. Thus, if the real-time state data received by the user terminal is 12 km/h, it means that the warning event corresponding to the traveling speed has occurred, and the user should be warned.

At 340, when the warning event has occurred, a warning message is sent to the smart wearable device through the Blue Tooth connection between the user terminal and the smart wearable device, such that the smart wearable device performs warning. After the user terminal sends the warning message to the smart wearable device, the smart wearable device can warn the user according to the warning message. Therefore, the user can timely learn that abnormality occurs in the self-balancing vehicle.

In some embodiments, the user terminal can enable the smart warning mode according to an enabling instruction input by the user.

Figure 4:
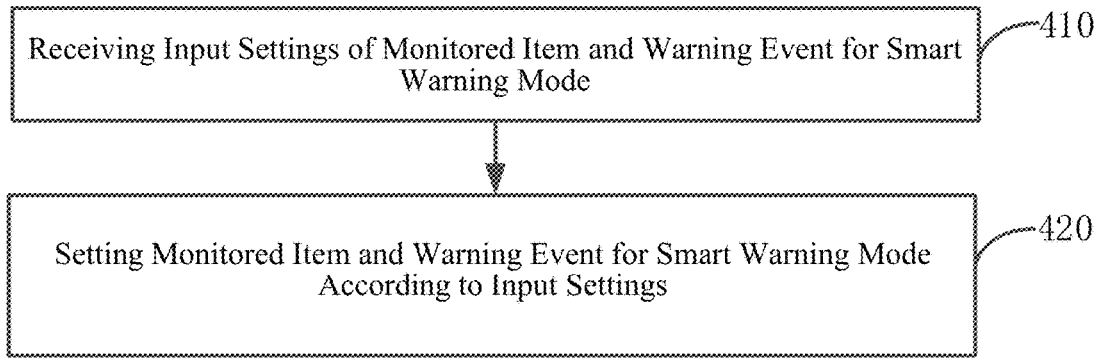
FIG. 4 is a flow chart illustrating a method for setting a monitored item and a warning event according to an exemplary embodiment of the present disclosure.

FIG. 4 is a flow chart of a method 400 for setting a monitored item and a warning event according to an exemplary embodiment of the present disclosure, which can be implemented, for example, in a user terminal. The method 400 can be performed after the user terminal enables the smart warning mode and can be combined with any of the above-described methods. As shown in FIG. 4, at 410, input settings of a monitored item and a warning event for the smart warning mode are received. In some embodiments, the settings can be managed using a management interface on the user terminal. In some embodiments, the settings can be user selected, meaning that the user selects among monitored items and warning events provided in the management interface. In some embodiments, the settings can be user designated, meaning that the user informs the user terminal of designated monitored item and warning event.

At 420, the monitored item and the warning event for the smart warning mode are set according to the input settings. In some embodiments, the user terminal can set the monitored item and the warning event for the smart warning mode according to the input settings from the user.

Therefore, according to the present disclosure, the user terminal can set the monitored item and the warning event according to the need of the user, thus improving the user experience.

Figure 5:
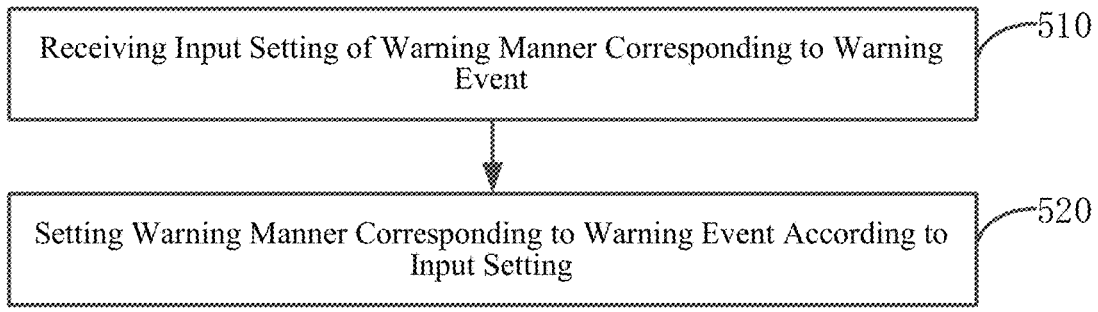
FIG. 5 is a flow chart illustrating a method for setting a warning manner according to an exemplary embodiment of the present disclosure.

FIG. 5 is a flow chart of a method 500 for setting a warning manner according to an exemplary embodiment of the present disclosure, which can be implemented, for example, in a user terminal. The method 500 can be performed after the user terminal enables the smart warning mode and can be combined with any of the above-described methods. As shown in FIG. 5, at 510, an input setting of a warning manner corresponding to the warning event is received. The warning manner can be, for example, a sound warning, a light warning, or a vibration warning, etc. In some embodiments, each warning event can have a corresponding warning manner. For example, the traveling speed of the self-balancing vehicle being higher than a speed threshold can have a sound warning as the warning manner. In addition, the warning manner corresponding to each warning event can be designated by the user, or can be automatically set by the user terminal based on the user habit.

At 520, the warning manner corresponding to the warning event is set according to the input setting.

Therefore, according to the present disclosure, the user terminal can set a preset warning manner according to the need of the user, thus improving the user experience.

Figure 6:
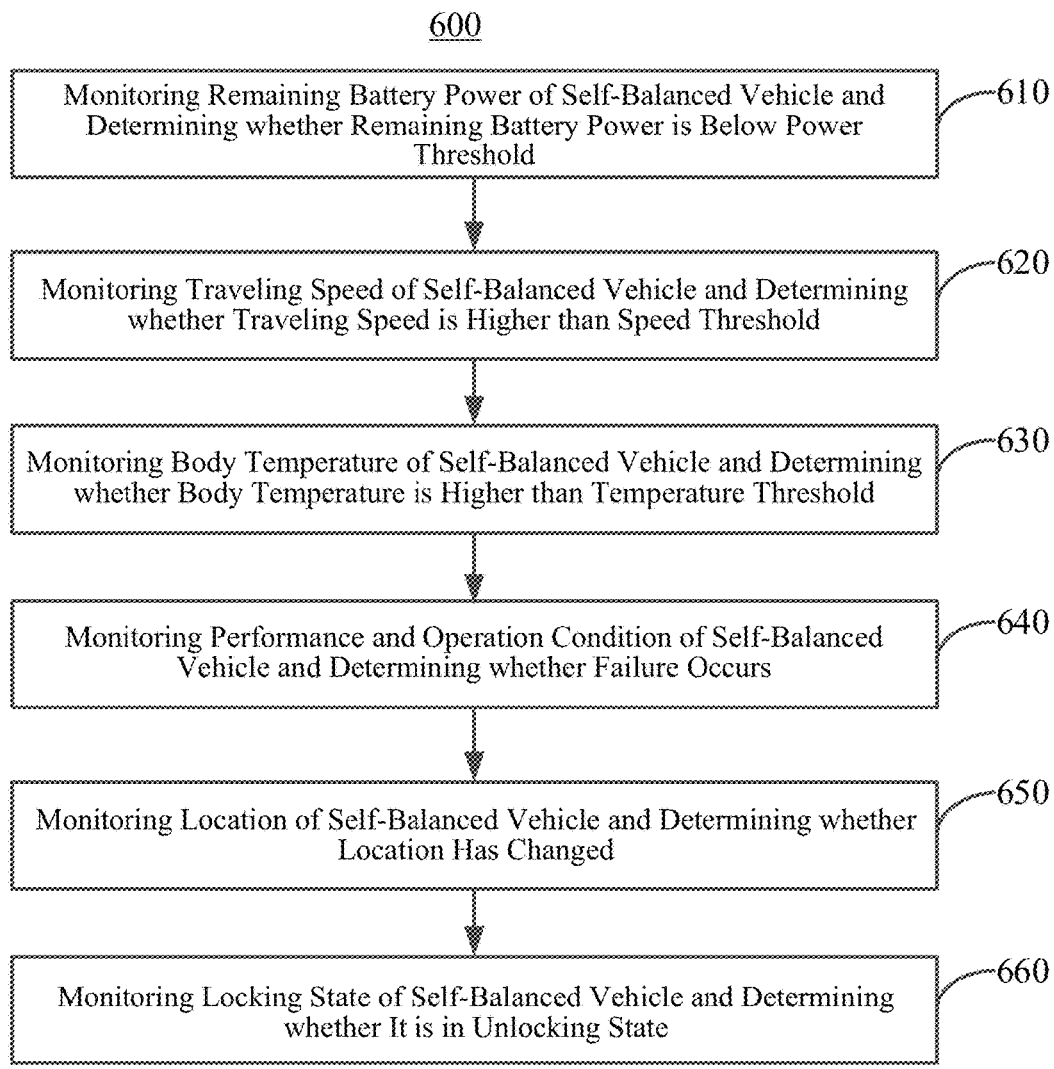
FIG. 6 is a flow chart illustrating an exemplary detailed process for monitoring the monitored item in traveling state data and determining whether the warning event has occurred.

FIG. 6 is a flow chart of an exemplary detailed process 600 for monitoring the monitored item in the traveling state data and determining whether the warning event has occurred (in 150 of FIG. 1), consistent with embodiments of the present disclosure. The process 600 can be implemented, for example, in a user terminal.

At 610, a remaining battery power of the self-balancing vehicle is monitored and it is determined whether the remaining battery power is below a power threshold. That is, the remaining battery power is a monitored item and the remaining battery power being below a power threshold is a corresponding warning event.

At 620, a traveling speed of the self-balancing vehicle is monitored and it is determined whether the traveling speed is higher than a speed threshold. That is, the traveling speed is a monitored item and the traveling speed being higher than a speed threshold is a corresponding warning event.

At 630, a body temperature of the self-balancing vehicle is monitored and it is determined whether the body temperature is higher than a temperature threshold. That is, the body temperature is a monitored item and the body temperature being higher than a temperature threshold is a corresponding warning event.

At 640, performance and operation condition of the self-balancing vehicle are monitored and it is determined whether a failure occurs. That is, the performance and operation condition are a monitored item and a failure occurring in the performance and operation condition is a corresponding warning event.

At 650, a location of the self-balancing vehicle is monitored and it is determined whether the location has changed. That is, the location of the self-balancing vehicle is a monitored item and the location of the self-balancing vehicle having changed is a corresponding warning event.

At 660, a locking state of the self-balancing vehicle is monitored and it is determined whether the self-balancing vehicle is in an unlocked state. That is, the locking state of the self-balancing vehicle is a monitored item and the self-balancing vehicle being in an unlocked state is a corresponding warning event.

Therefore, according to the present disclosure, the user terminal can support a plurality of monitored items and corresponding warning events, and can provide various warning messages to the user. Thereby, it is convenient for the user to operate the self-balancing vehicle, and it can also improve safety in the operation of the self-balancing vehicle and improve the user experience.

Figure 7:
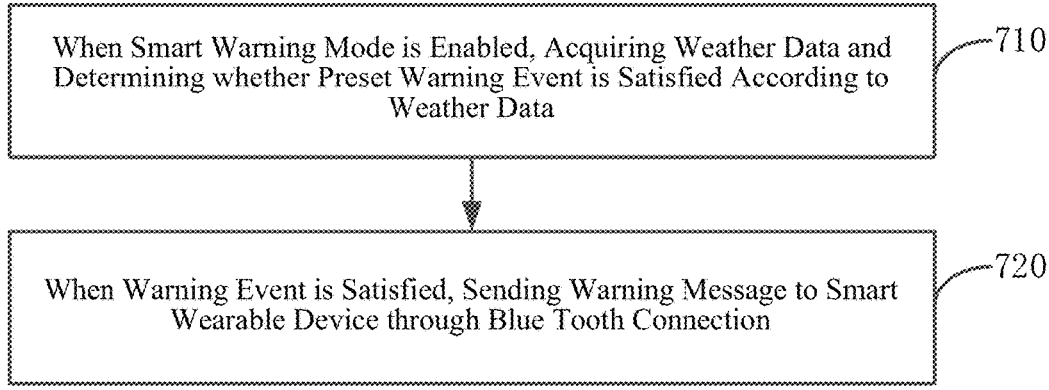
FIG. 7 is a flow chart illustrating another exemplary detailed process of process 150 shown in FIG. 1.

FIG. 7 is a flow chart of another exemplary detailed process of 150 in FIG. 1. As shown in FIG. 7, at 710, when the smart warning mode is enabled, weather data is acquired and it is determined whether the preset warning event has occurred according to the weather data. That is, in this example, the weather data is a monitored item and bad weather is a corresponding warning event. The bad weather can refer to, for example, a rainy day, a windy day, etc.

At 720, when the warning event has occurred, a warning message is sent to the smart wearable device through the Blue Tooth connection between the user terminal and the smart wearable device. For example, if the weather data indicates a rainy day, it matches a corresponding warning event and the user terminal can warn the user through the smart wearable device. Thereby, the user can timely learn about the rainy day and can make preparation for safe traveling.

Therefore, according to the present disclosure, the user can timely learn about the weather warning when using the self-balancing vehicle. Thus, traveling safety of the self-balancing vehicle can be ensured, the user can conveniently operate the self-balancing vehicle, and the user experience is improved.

Figure 8:
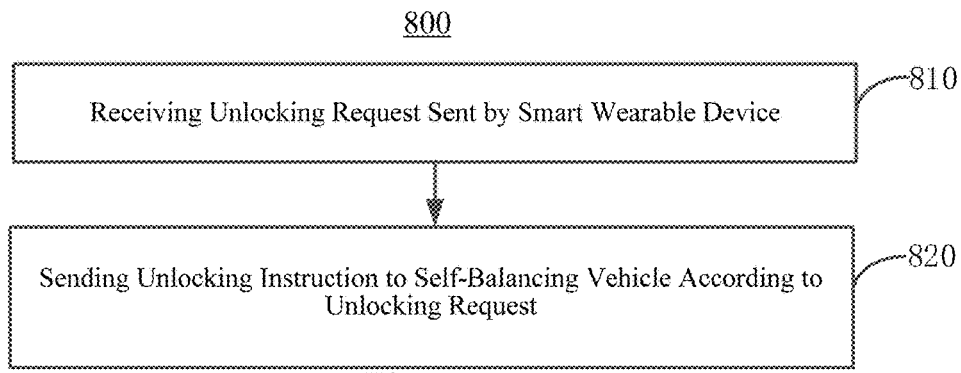
FIG. 8 is a flow chart illustrating a method for unlocking a self-balancing vehicle according to an exemplary embodiment of the present disclosure.

FIG. 8 is a flow chart of a method 800 for unlocking a self-balancing vehicle according to an exemplary embodiment of the present disclosure, which can be implemented, for example, in a user terminal. The method 800 can be combined with any of the above-described methods. As shown in FIG. 8, at 810, an unlocking request sent by the smart wearable device is received. At 820, an unlocking instruction is sent to the self-balancing vehicle according to the unlocking request, such that the self-balancing vehicle releases a locking state according to the received unlocking instruction.

Therefore, according to the present disclosure, data communication between the smart wearable device and the self-balancing vehicle can be indirectly established through the user terminal. This is convenient for the user and improves the user experience.

Figure 9:
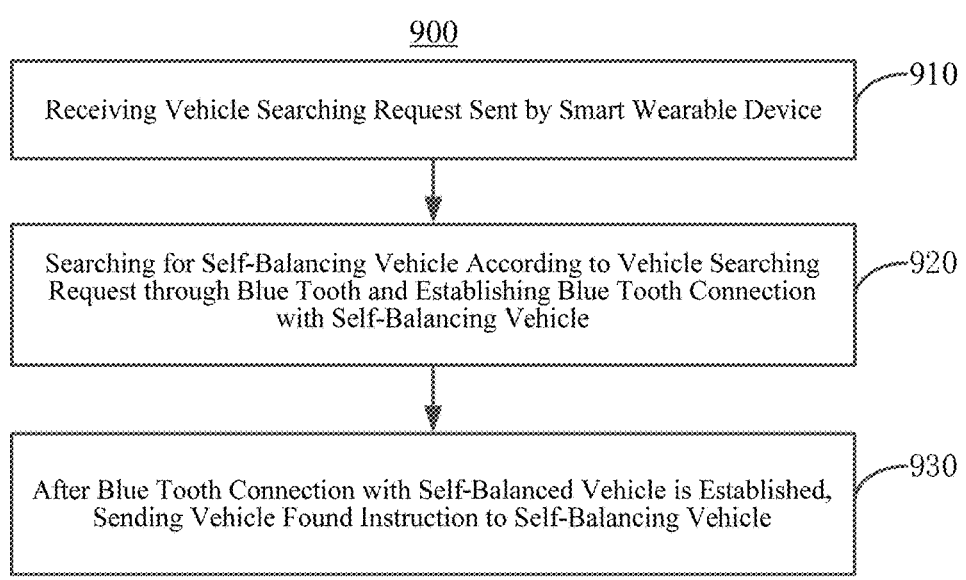
FIG. 9 is a flow chart illustrating a method for searching a self-balancing vehicle according to an exemplary embodiment of the present disclosure.

FIG. 9 is a flow chart of a method 900 for searching a self-balancing vehicle according to an exemplary embodiment of the present disclosure, which can be implemented, for example, in a user terminal. As shown in FIG. 9, at 910, a vehicle searching request sent by the smart wearable device is received. At 920, the self-balancing vehicle is searched for through Blue Tooth according to the vehicle searching request and a Blue Tooth connection is established with the self-balancing vehicle. At 930, after the Blue Tooth connection with the self-balancing vehicle is established, a vehicle found instruction is sent to the self-balancing vehicle, such that the self-balancing vehicle performs a vehicle found prompt. The vehicle found prompt can be a sound prompt or a light prompt, etc.

Therefore, according to the present disclosure, the self-balancing vehicle can perform a vehicle found prompt under the vehicle searching request of the smart wearable device. Thus, data communication between the smart wearable device and the self-balancing vehicle can be indirectly established through the user terminal. This is convenient for the user and improves the user experience.

Figure 10:
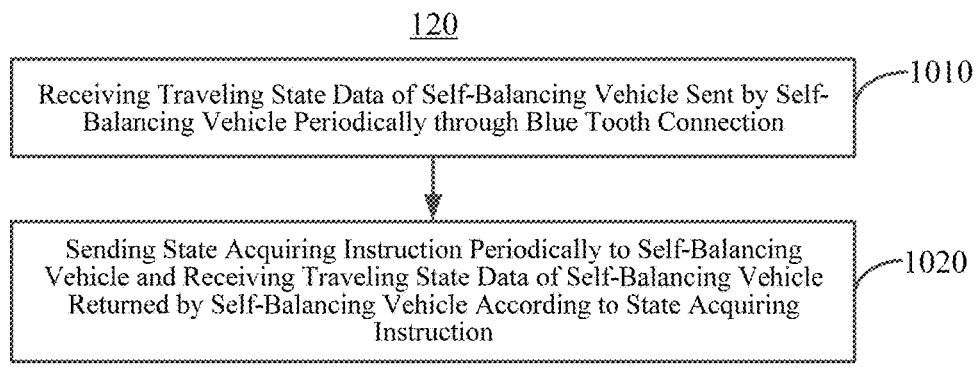
FIG. 10 is a flow chart illustrating an exemplary detailed process of process 120 shown in FIG. 1.

FIG. 10 is a flow chart of an exemplary detailed process of 120 in FIG. 1. As shown in FIG. 10, at 1010, traveling state data of the self-balancing vehicle, which is sent by the self-balancing vehicle periodically, is received through the Blue Tooth connection between the self-balancing vehicle and the user terminal. At 1020, a state acquiring instruction is sent periodically to the self-balancing vehicle and traveling state data of the self-balancing vehicle, which is returned by the self-balancing vehicle according to the state acquiring instruction, is received. In some embodiments, the acquired traveling state data is displayed in the management interface, to facilitate the user to manage the self-balancing vehicle according to the data.

Therefore, according to the present disclosure, the user terminal can acquire the traveling state data of the self-balancing vehicle either by passively receiving the data or by actively acquiring the data. Thus, the efficiency of the user terminal acquiring the traveling state data of the self-balancing vehicle can be improved.

FIG. 11 is a flow chart of an exemplary detailed process of 140 in FIG. 1. As shown in FIG. 11, at 1110, when a plurality of smart wearable devices are identified, a user selection instruction to select a smart wearable device is received, and the smart wearable device selected by the user is connected according to the user selection instruction. At 1120, when a plurality of smart wearable devices are identified, a smart wearable device with the highest priority according to a preset priority order is connected.

Therefore, according to the present disclosure, the smart wearable device to be connected with the user terminal can be determined either by user selection or based on a priority order. This can ensure that the selected smart wearable device can accomplish the warning function and the efficiency of managing the self-balancing vehicle can be improved.

In some embodiments, if the warning event has occurred, the warning event and a corresponding preset warning manner are sent to the smart wearable device through the Blue Tooth connection between the user terminal and the smart wearable device, such that the smart wearable device performs warning according to the preset warning manner. For example, the present warning manner can be a sound warning and the smart wearable device can perform a sound warning according to the warning event.

FIG. 12 shows an exemplary application scenario for implementing the methods of the present disclosure. The application scenario involves a smart wearable device, a user terminal, and a self-balancing vehicle. In some embodiments, there can be one or more self-balancing vehicles, and the user can select and manage one or more self-balancing vehicles from the identified self-balancing vehicles. The user terminal establishes a Blue Tooth connection with the self-balancing vehicle. The user terminal acquires travelling state data of the self-balancing vehicle through the Blue Tooth connection between the user terminal and the self-balancing vehicle. The user terminal determines whether the smart warning mode is enabled. If the smart warning mode is enabled, the user terminal establishes a Blue Tooth connection with the smart wearable device. The smart wearable device can be, for example, a smart bracelet. The user terminal acquires a preset monitored item and a preset warning event, monitors the monitored item in the travelling state data, determines whether the warning event has occurred, and, if the warning event has occurred, sends a warning message to the smart wearable device through the Blue Tooth connection between the user terminal and the smart wearable device.

FIG. 13 is a block diagram of a device 1300 for managing a self-balancing vehicle according to an exemplary embodiment of the present disclosure, which can be implemented, for example, in a user terminal and configured to perform, for example, the method for managing the self-balancing vehicle as shown in FIG. 1. The device 1300 includes a first connecting module 1310, a traveling-state-data acquiring module 1320, a warning-mode determining module 1330, a second connecting module 1340, and a warning module 1350.

The first connecting module 1310 is configured to establish a Blue Tooth connection with the self-balancing vehicle. The traveling-state-data acquiring module 1320 is configured to acquire traveling state data of the self-balancing vehicle through the Blue Tooth connection between the user terminal and the self-balancing vehicle. The warning-mode determining module 1330 is configured to determine whether a smart warning mode is enabled. The second connecting module 1340 is configured to establish a Blue Tooth connection with a smart wearable device if the smart warning mode is enabled. The warning module 1350 is configured to acquire a preset monitored item and a preset warning event, monitor the monitored item in the traveling state data and determine whether the warning event has occurred, and, if the warning event has occurred, send a warning message to the smart wearable device through the Blue Tooth connection between the user terminal and the smart wearable device.

Figure 14:
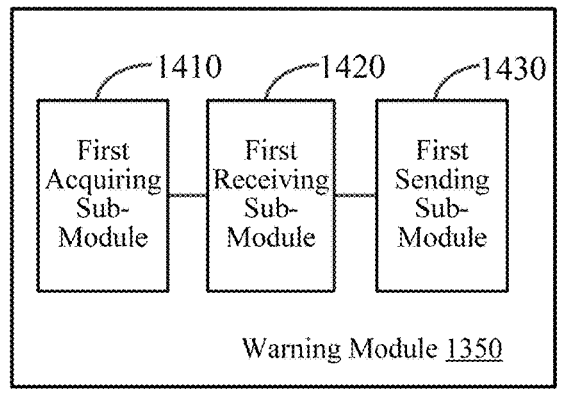
FIG. 14 is a block diagram of an exemplary warning module.

FIG. 14 is a block diagram of an exemplary warning module 1350, which includes a first acquiring sub-module 1410, a first receiving sub-module 1420, and a first sending sub-module 1430. The first acquiring sub-module 1410 is configured to acquire the preset monitored item and the preset warning event, and send the monitored item and the warning event to the self-balancing vehicle, such that the self-balancing vehicle monitors the monitored item in its traveling state data. The first receiving sub-module 1420 is configured to receive a warning message returned by the self-balancing vehicle through the Blue Tooth connection between the user terminal and the self-balancing vehicle when the self-balancing vehicle monitors that the warning event has occurred. The first sending sub-module 1430 is configured to send the warning message returned by the self-balancing vehicle to the smart wearable device through the Blue Tooth connection between the user terminal and the smart wearable device, such that the smart wearable device performs warning.

Figure 15:
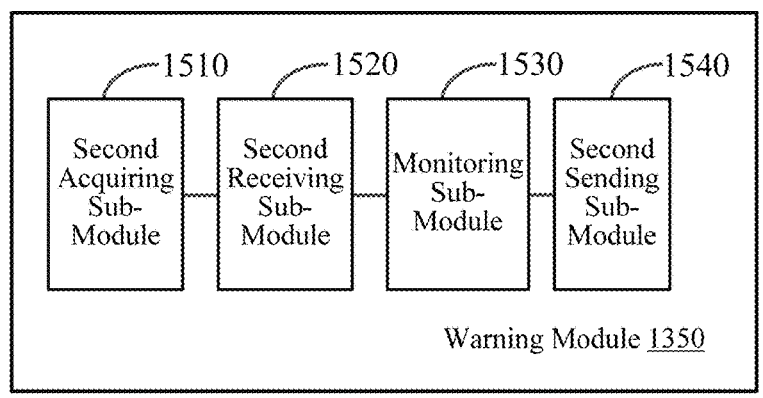
FIG. 15 is a block diagram of another exemplary warning module.

FIG. 15 is a block diagram of another exemplary warning module 1350, which includes a second acquiring sub-module 1510, a second receiving sub-module 1520, a monitoring sub-module 1530, and a second sending sub-module 1540. The second acquiring sub-module 1510 is configured to acquire a preset monitored item and a preset warning event, and send the monitored item to the self-balancing vehicle. The second receiving sub-module 1520 is configured to receive real-time state data corresponding to the preset monitored item sent by the self-balancing vehicle. The monitoring sub-module 1530 is configured to monitor the real-time state data and determine whether the warning event has occurred. The second sending sub-module 1540 is configured to, when the warning event has occurred, send a warning message to the smart wearable device through the Blue Tooth connection between the user terminal and the smart wearable device, such that the smart wearable device performs warning.

Figure 16:
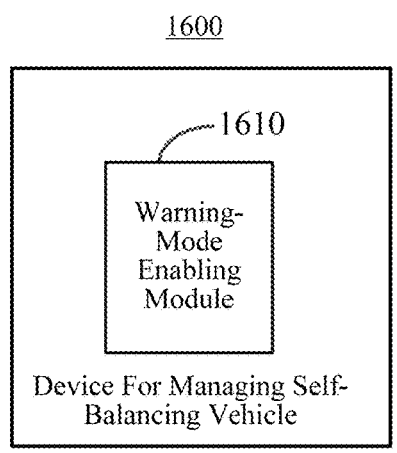
FIG. 16 is a block diagram of a device for managing a self-balancing vehicle according to another exemplary embodiment of the present disclosure.

FIG. 16 is a block diagram of a device 1600 for managing a self-balancing vehicle according to another exemplary embodiment of the present disclosure, which can be implemented, for example, in a user terminal. The device 1600 can include one or more of the modules described above (not shown in FIG. 16), and further includes a warning-mode enabling module 1610 configured to receive an instruction for enabling the smart warning mode and enable the smart warning mode.

Figure 17:
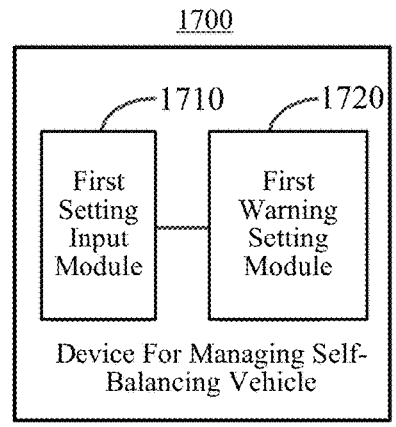
FIG. 17 is a block diagram of a device for managing a self-balancing vehicle according to another exemplary embodiment of the present disclosure.

FIG. 17 is a block diagram of a device 1700 for managing a self-balancing vehicle according to another exemplary embodiment of the present disclosure, which can be implemented, for example, in a user terminal. The device 1700 can include one or more of the modules described above (not shown in FIG. 17), and further includes a first setting input module 1710 and a first warning setting module 1720. The first setting input module 1710 is configured to receive input settings of a monitored item and a warning event for the smart warning mode. The first warning setting module 1720 is configured to set the monitored item and the warning event for the smart warning mode according to the input settings.

Figure 18:
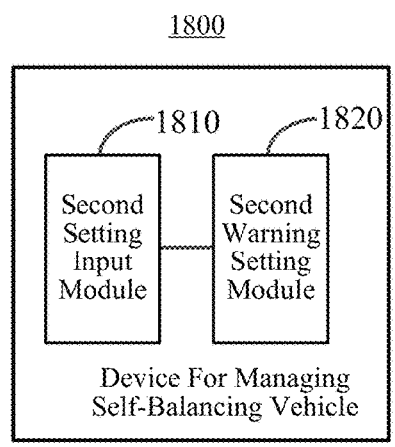
FIG. 18 is a block diagram of a device for managing a self-balancing vehicle according to another exemplary embodiment of the present disclosure.

FIG. 18 is a block diagram of a device 1800 for managing a self-balancing vehicle according to another exemplary embodiment of the present disclosure, which can be implemented, for example, in a user terminal. The device 1800 can include one or more of the modules described above (not shown in FIG. 18), and further includes a second setting input module 1810 and a second warning setting module 1820. The second setting input module 1810 is configured to receive an input setting of a warning manner corresponding to the warning event. The second warning setting module 1820 is configured to set the warning manner corresponding to the warning event according to the input setting.

Figure 19:
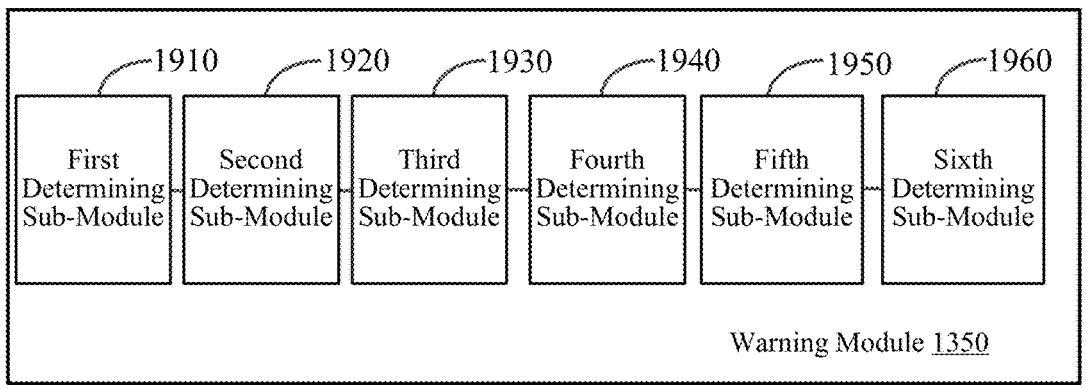
FIG. 19 is a block diagram of another exemplary warning module.

FIG. 19 is a block diagram of another exemplary warning module 1350, which includes at least one of the following sub-modules: a first determining sub-module 1910, a second determining sub-module 1920, a third determining sub-module 1930, a fourth determining sub-module 1940, a fifth determining sub-module 1950, and a sixth determining sub-module 1960.

The first determining sub-module 1910 is configured to acquire a preset monitored item and a preset warning event, monitor a remaining battery power of the self-balancing vehicle, determine whether the remaining battery power is below a power threshold, and, if the remaining battery power is below the power threshold, determine that the warning event has occurred and send a warning message to the smart wearable device through the Blue Tooth connection between the user terminal and the smart wearable device.

The second determining sub-module 1920 is configured to acquire a preset monitored item and a preset warning event, monitor a traveling speed of the self-balancing vehicle, determine whether the traveling speed is higher than a speed threshold, and, if the traveling speed is higher than the speed threshold, determine that the warning event has occurred and send a warning message to the smart wearable device through the Blue Tooth connection between the user terminal and the smart wearable device.

The third determining sub-module 1930 is configured to acquire a preset monitored item and a preset warning event, monitor a body temperature of the self-balancing vehicle, determine whether the body temperature is higher than a temperature threshold, and, if the body temperature is higher than the temperature threshold, determine that the warning event has occurred and send a warning message to the smart wearable device through the Blue Tooth connection between the user terminal and the smart wearable device.

The fourth determining sub-module 1940 is configured to acquire a preset monitored item and a preset warning event, monitor performance and operation condition of the self-balancing vehicle, determine whether a failure occurs, and, if a failure occurs, determine that the warning event has occurred and send a warning message to the smart wearable device through the Blue Tooth connection between the user terminal and the smart wearable device.

The fifth determining sub-module 1950 is configured to acquire a preset monitored item and a preset warning event, monitor a location of the self-balancing vehicle, determine whether the location has changed, and, if the location has changed, determine that the warning event has occurred and send a warning message to the smart wearable device through the Blue Tooth connection between the user terminal and the smart wearable device.

The sixth determining sub-module 1960 is configured to acquire a preset monitored item and a preset warning event, monitor a locking state of the self-balancing vehicle, determine whether the self-balancing vehicle is in an unlocked state, and, if the self-balancing vehicle is in an unlocked state, determine that the warning event has occurred and send a warning message to the smart wearable device through the Blue Tooth connection between the user terminal and the smart wearable device.

Figure 20:
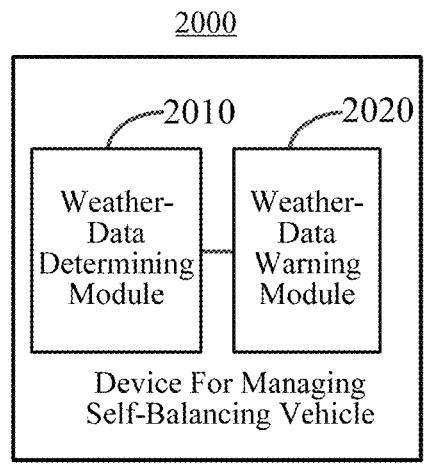
FIG. 20 is a block diagram of a device for managing a self-balancing vehicle according to another exemplary embodiment of the present disclosure.

FIG. 20 is a block diagram of a device 2000 for managing a self-balancing vehicle according to another exemplary embodiment of the present disclosure, which can be implemented, for example, in a user terminal. The device 2000 can include one or more of the modules described above (not shown in FIG. 20), and further includes a weather-data determining module 2010 and a weather-data warning module 2020. The weather-data determining module 2010 is configured to, when the smart warning mode is enabled, acquire weather data and determine whether a preset warning event has occurred according to the weather data. The weather-data warning module 2020 is configured to, when the warning event has occurred, send a warning message to the smart wearable device through the Blue Tooth connection between the user terminal and the smart wearable device.

Figure 21:
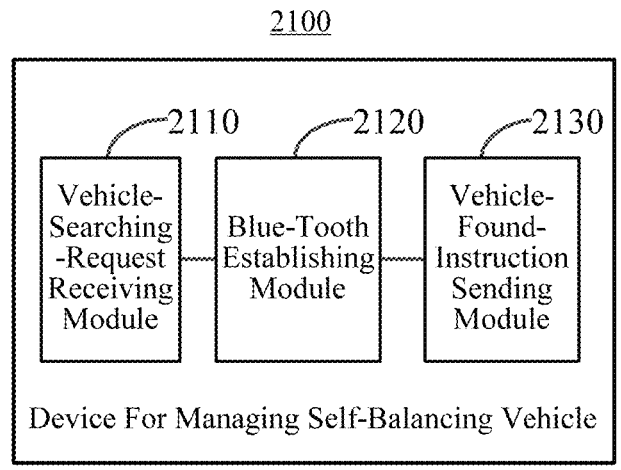
FIG. 21 is a block diagram of a device for managing a self-balancing vehicle according to another exemplary embodiment of the present disclosure.

FIG. 21 is a block diagram of a device 2100 for managing a self-balancing vehicle according to another exemplary embodiment of the present disclosure, which can be implemented, for example, in a user terminal. The device 2100 can include one or more of the modules described above (not shown in FIG. 21), and further includes a vehicle-searching-request receiving module 2110, a Blue-Tooth establishing module 2120, and a vehicle-found-instruction sending module 2130. The vehicle-searching-request receiving module 2110 is configured to receive a vehicle searching request sent by the smart wearable device. The Blue-Tooth establishing module 2120 is configured to search for the self-balancing vehicle through Blue Tooth according to the vehicle searching request and establish a Blue Tooth connection with the self-balancing vehicle. The vehicle-found-instruction sending module 2130 is configured to, after the Blue Tooth connection with the self-balancing vehicle is established, send a vehicle found instruction to the self-balancing vehicle such that the self-balancing vehicle performs a vehicle found prompt.

Figure 22:
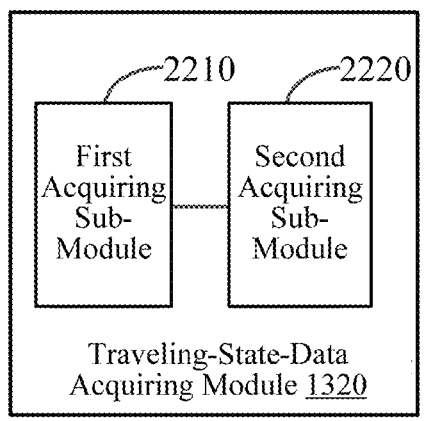
FIG. 22 is a block diagram of an exemplary traveling-state-data acquiring module.

FIG. 22 is a block diagram of an exemplary traveling-state-data acquiring module 1320, which includes a first acquiring sub-module 2210 and a second acquiring sub-module 2220. The first acquiring sub-module 2210 is configured to receive traveling state data of the self-balancing vehicle sent by the self-balancing vehicle periodically through the Blue Tooth connection between the user terminal and the self-balancing vehicle. The second acquiring sub-module 2220 is configured to send a state acquiring instruction periodically to the self-balancing vehicle and receive traveling state data of the self-balancing vehicle returned by the self-balancing vehicle according to the state acquiring instruction.

Figure 23:
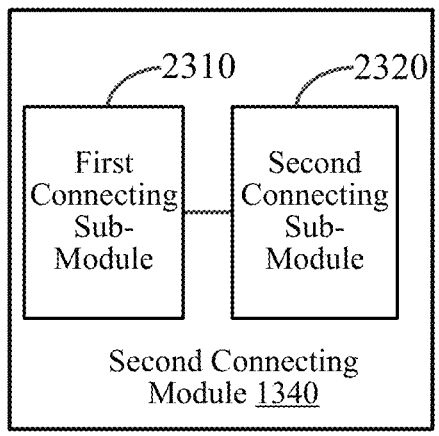
FIG. 23 is a block diagram of an exemplary second connecting module.

FIG. 23 is a block diagram of an exemplary second connecting module 1340, which includes a first connecting sub-module 2310 or a second connecting sub-module 2320. The first connecting sub-module 2310 is configured to, when a plurality of smart wearable devices are identified, receive a user selection instruction for selecting a smart wearable device, and connect the smart wearable device selected by the user according to the user selection instruction. The second connecting sub-module 2320 is configured to, when a plurality of smart wearable devices are identified, connect a smart wearable device with the highest priority according to a preset priority order.

Figure 24:
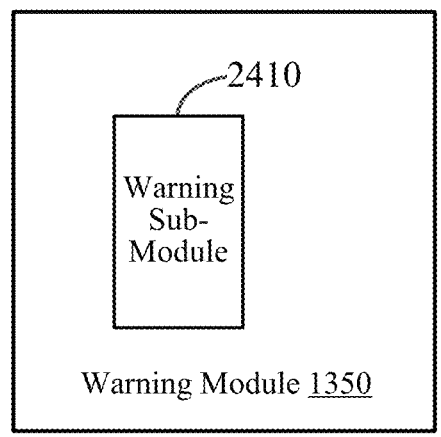
FIG. 24 is a block diagram of another exemplary warning module.

FIG. 24 is a block diagram of another exemplary warning module 1350, which includes a warning sub-module 2410 configured to, if the warning event has occurred, send the warning event and a corresponding preset warning manner to the smart wearable device through the Blue Tooth connection between the user terminal and the smart wearable device, such that the smart wearable device performs warning according to the preset warning manner.

Functions and operations of the modules in the above-described devices are similar to the above-described methods, and thus their description is omitted here. The device embodiments described above are merely illustrative. The units described as separate may be or may not be physically separate, and the components illustrated as units may be or may not be physical units, and may be at the same location, or may be distributed in multiple units over the network. A part of or all of the modules can be selected to achieve the objective of the present disclosure as desired.

Figure 25:
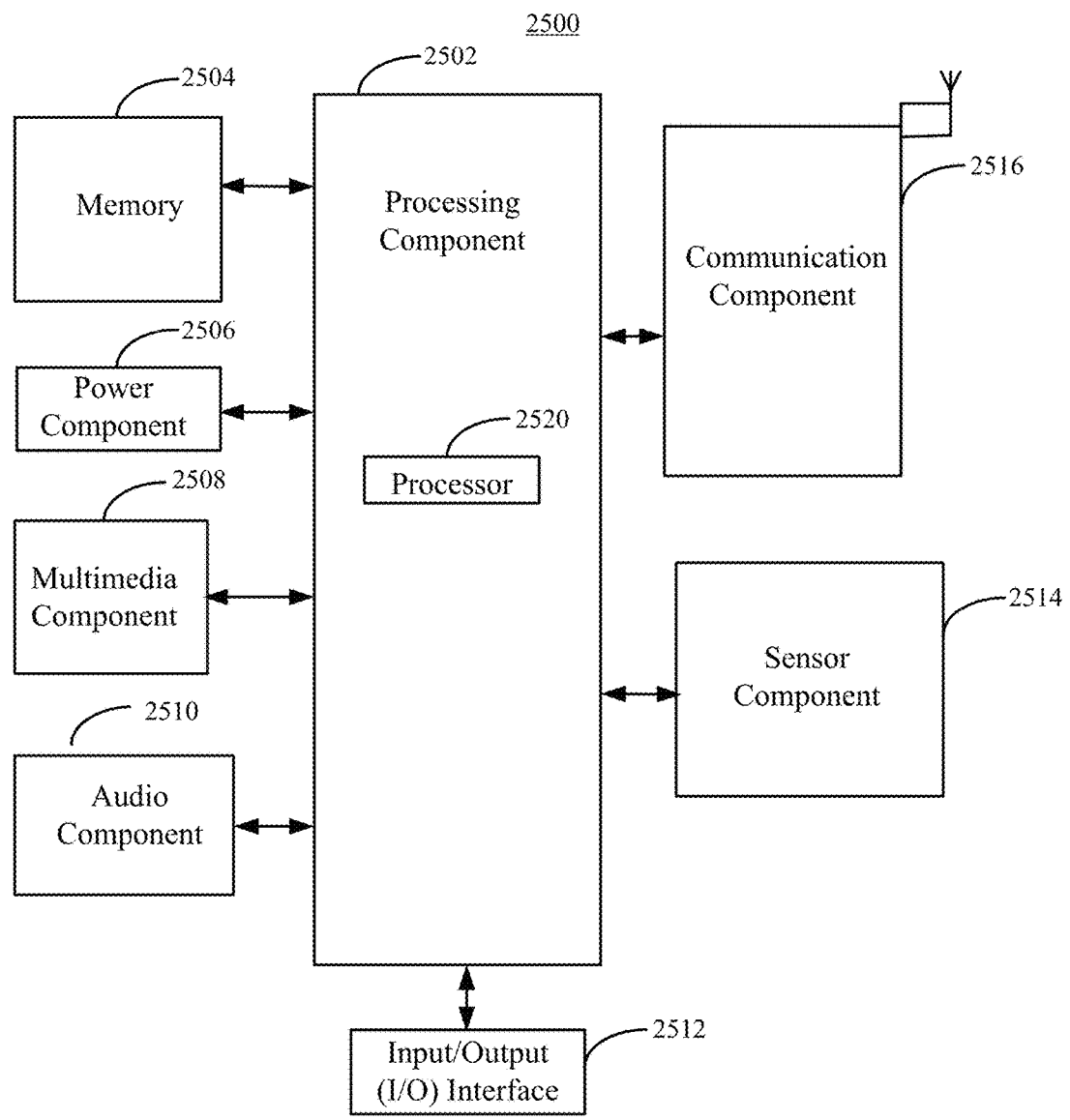
FIG. 25 is a block diagram of a device for managing a self-balancing vehicle according to another exemplary embodiment of the present disclosure.

FIG. 25 is a block diagram of a device 2500 (at a terminal side) for managing a self-balancing vehicle according to an exemplary embodiment. For example, the device 2500 may be a mobile phone with routing function, a computer, a digital broadcast terminal, a messaging device, a gaming console, a tablet, a medical device, exercise equipment, a personal digital assistant, or the like.

Referring to FIG. 25, the device 2500 includes one or more of the following components: a processing component 2502, a memory 2504, a power component 2506, a multimedia component 2508, an audio component 2510, an input/output (I/O) interface 2512, a sensor component 2514, and a communication component 2516.

The processing component 2502 typically controls overall operations of the device 2500, such as the operations associated with display, telephone calls, data communications, camera operations, and recording operations. The processing component 2502 may include one or more processors 2520 to execute instructions to perform all or part of the steps in the above described methods. Moreover, the processing component 2502 may include one or more modules which facilitate the interaction between the processing component 2502 and other components. For instance, the processing component 2502 may include a multimedia module to facilitate the interaction between the multimedia component 2508 and the processing component 2502.

The memory 2504 is configured to store various types of data to support the operation of the device 2500. Examples of such data include instructions for any applications or methods operated on the device 2500, contact data, phonebook data, messages, pictures, video, etc. The memory 2504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2506 provides power to various components of the device 2500. The power component 2506 may include a power management system, one or more power sources, and any other components associated with the generation, management, and distribution of power in the device 2500.

The multimedia component 2508 includes a screen providing an output interface between the device 2500 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2508 includes a front camera and/or a rear camera. The front camera and the rear camera may receive an external multimedia datum while the device 2500 is in an operation mode, such as a photographing mode or a video mode. Each of the front camera and the rear camera may be a fixed optical lens system or have focus and optical zoom capability.

The audio component 2510 is configured to output and/or input audio signals. For example, the audio component 2510 includes a microphone configured to receive an external audio signal when the device 2500 is in an operation mode, such as a call mode, a recording mode, and a voice recognition mode. The received audio signal may be further stored in the memory 2504 or transmitted via the communication component 2516. In some embodiments, the audio component 2510 further includes a speaker to output audio signals.

The I/O interface 2512 provides an interface between the processing component 2502 and peripheral interface modules, such as a keyboard, a click wheel, buttons, and the like. The buttons may include, but are not limited to, a home button, a volume button, a starting button, and a locking button.

The sensor component 2514 includes one or more sensors to provide status assessments of various aspects of the device 2500. For instance, the sensor component 2514 may detect an open/closed status of the device 2500, relative positioning of components, e.g., the display and the keypad, of the device 2500, a change in position of the device 2500 or a component of the device 2500, a presence or absence of user contact with the device 2500, an orientation or an acceleration/deceleration of the device 2500, and a change in temperature of the device 2500. The sensor component 2514 may include a proximity sensor configured to detect the presence of nearby objects without any physical contact. The sensor component 2514 may also include a light sensor, such as a CMOS or CCD image sensor, for use in imaging applications. In some embodiments, the sensor component 2514 may also include an accelerometer sensor, a gyroscope sensor, a magnetic sensor, a pressure sensor, a microwave sensor or a temperature sensor.

The communication component 2516 is configured to facilitate communication, wired or wirelessly, between the device 2500 and other devices. The device 2500 can access a wireless network based on a communication standard, such as WiFi, 2G, 3G, or 4G, or a combination thereof. In one exemplary embodiment, the communication component 2516 receives a broadcast signal or broadcast associated information from an external broadcast management system via a broadcast channel. In one exemplary embodiment, the communication component 2516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or another technology.

In exemplary embodiments, the device 2500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2504, executable by the processor 2520 in the device 2500, for performing a method consistent with embodiments of the present disclosure. For example, the non-transitory computer-readable storage medium may be a ROM, a RAM, a CD-ROM, a magnetic tape, a floppy disc, an optical data storage device, or the like.

In accordance with the present disclosure, there is also provided a non-transitory computer readable storage medium storing instructions that, when executed by a processor of a mobile terminal, cause the mobile terminal to perform a method for managing a self-balancing vehicle consistent with embodiments of the present disclosure.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for managing a self-balancing vehicle, comprising:
   establishing a first Blue Tooth connection with the self-balancing vehicle;
   acquiring traveling state data of the self-balancing vehicle through the first Blue Tooth connection;
   determining whether a smart warning mode is enabled;
   establishing, if the smart warning mode is enabled, a second Blue Tooth connection with a smart wearable device;
   acquiring a preset monitored item and a preset warning event;
   monitoring the monitored item in the traveling state data for determining whether the warning event has occurred; and
   sending, if the warning event has occurred, a warning message to the smart wearable device through the second Blue Tooth connection.

2. The method of claim 1, wherein monitoring the monitored item in the traveling state data for determining whether the warning event has occurred includes:
   sending the monitored item and the warning event to the self-balancing vehicle; and
   receiving the warning message returned by the self-balancing vehicle through the first Blue Tooth connection.

3. The method of claim 1, wherein monitoring the monitored item in the traveling state data for determining whether the warning event has occurred includes:
   sending the monitored item to the self-balancing vehicle;
   receiving real-time state data corresponding to the preset monitored item, the real-time state data being sent by the self-balancing vehicle; and
   monitoring the real-time state data for determining whether the warning event has occurred.

4. The method of claim 1, further comprising:
   receiving an instruction for enabling the smart warning mode; and
   enabling the smart warning mode according to the instruction.

5. The method of claim 4, wherein enabling the smart warning mode includes:
   receiving input settings of the monitored item and the warning event for the smart warning mode; and
   setting the monitored item and the warning event for the smart warning mode according to the input settings.

6. The method of claim 4, wherein enabling the smart warning mode includes:
   receiving an input setting of a warning manner corresponding to the warning event; and
   setting the warning manner corresponding to the warning event according to the input setting.

7. The method of claim 1, wherein monitoring the monitored item in the traveling state data for determining whether the warning event has occurred includes at least one of:
   monitoring a remaining battery power of the self-balancing vehicle and determining whether the remaining battery power is below a power threshold;
   monitoring a traveling speed of the self-balancing vehicle and determining whether the traveling speed is higher than a speed threshold;
   monitoring a body temperature of the self-balancing vehicle and determining whether the body temperature is higher than a temperature threshold;
   monitoring performance and operation condition of the self-balancing vehicle and determining whether a failure occurs;
   monitoring a location of the self-balancing vehicle and determining whether the location has changed; or
   monitoring a locking state of the self-balancing vehicle and determining whether the self-balancing vehicle is in an unlocked state.

8. The method of claim 1, further comprising:
   acquiring, when the smart warning mode is enabled, weather data and determining whether the preset warning event has occurred according to the weather data.

9. The method of claim 1, further comprising:
   receiving an unlocking request sent by the smart wearable device; and
   sending an unlocking instruction to the self-balancing vehicle according to the unlocking request, instructing the self-balancing vehicle to release a locking state.

10. The method of claim 1, further comprising:
    receiving a vehicle searching request sent by the smart wearable device;
    searching for the self-balancing vehicle through Blue Tooth according to the vehicle searching request and establishing the first Blue Tooth connection; and
    sending, after the first Blue Tooth connection is established, a vehicle found instruction to the self-balancing vehicle, instructing the self-balancing vehicle to perform a vehicle found prompt.

11. The method of claim 1, wherein acquiring the traveling state data of the self-balancing vehicle through the first Blue Tooth connection includes:
    receiving the traveling state data sent by the self-balancing vehicle periodically through the first Blue Tooth connection; or
    sending a state acquiring instruction periodically to the self-balancing vehicle and receiving traveling state data returned by the self-balancing vehicle according to the state acquiring instruction.

12. The method of claim 1, wherein establishing the second Blue Tooth connection includes:
    receiving, when a plurality of smart wearable devices are identified, a user selection instruction for selecting a smart wearable device, and connecting the smart wearable device selected by the user according to the user selection instruction; or
    connecting, when a plurality of smart wearable devices are identified, a smart wearable device with the highest priority according to a preset priority order.

13. The method of claim 1, wherein sending the warning message to the smart wearable device includes:
    sending, if the warning event has occurred, the warning event and a corresponding preset warning manner to the smart wearable device through the second Blue Tooth connection, for the smart wearable device to perform warning according to the preset warning manner.

14. An apparatus for managing a self-balancing vehicle, comprising:
    a processor; and
    a non-transitory memory storing instructions that, when executed by the processor, cause the processor to:
    establish a first Blue Tooth connection with the self-balancing vehicle;
    acquire traveling state data of the self-balancing vehicle through the first Blue Tooth connection;
    determine whether a smart warning mode is enabled;

establish, if the smart warning mode is enabled, a second Blue Tooth connection with a smart wearable device;

acquire a preset monitored item and a preset warning event;

monitor the monitored item in the traveling state data for determining whether the warning event has occurred; and send, if the warning event has occurred, a warning message to the smart wearable device through the second Blue Tooth connection.

15. The apparatus of claim 14, wherein the instructions further cause the processor to:

send the monitored item and the warning event to the self-balancing vehicle; and receive the warning message returned by the self-balancing vehicle through the first Blue Tooth connection.

16. The apparatus of claim 14, wherein the instructions further cause the processor to:

send the monitored item to the self-balancing vehicle;

receive real-time state data corresponding to the preset monitored item, the real-time state data being sent by the self-balancing vehicle; and monitor the real-time state data for determining whether the warning event has occurred.

17. The apparatus of claim 14, wherein the instructions further cause the processor to:

receive input settings of the monitored item and the warning event for the smart warning mode; and set the monitored item and the warning event for the smart warning mode according to the input settings.

18. The apparatus of claim 14, wherein the instructions further cause the processor to:

receive a vehicle searching request sent by the smart wearable device;

search for the self-balancing vehicle through Blue Tooth according to the vehicle searching request and establish the first Blue Tooth connection; and send, after the first Blue Tooth connection is established, a vehicle found instruction to the self-balancing vehicle, instructing the self-balancing vehicle to perform a vehicle found prompt.

19. The apparatus of claim 14, wherein the instructions further cause the processor to:

receive the traveling state data sent by the self-balancing vehicle periodically through the first Blue Tooth connection; or send a state acquiring instruction periodically to the self-balancing vehicle and receive traveling state data returned by the self-balancing vehicle according to the state acquiring instruction.

20. The apparatus of claim 14, wherein the instructions further cause the processor to:

receive an input setting of a warning manner corresponding to the warning event;

set the warning manner corresponding to the warning event according to the input setting; and send, if the warning event has occurred, the warning event and the warning manner to the smart wearable device through the second Blue Tooth connection, for the smart wearable device to perform warning according to the preset warning manner.

* * * * *